(12) United States Patent

Bao

(10) Patent No.: US 12,589,640 B1

(45) Date of Patent: Mar. 31, 2026

(54) LOCKING DEVICE FOR TONNEAU COVER

(71) Applicant: Junling Bao, Shanghai (CN)

(72) Inventor: Junling Bao, Shanghai (CN)

( * ) Notice: Subject to any disclaimer, the term of this patent is extended or adjusted under 35 U.S.C. 154(b) by 0 days.

(21) Appl. No.: 19/389,178

(22) Filed: Nov. 14, 2025

(30) Foreign Application Priority Data

Oct. 24, 2025 (CN) .......................... 202522255258.2

(51) Int. Cl.
B60J 7/19 (2006.01)

(52) U.S. Cl.
CPC ..................................... B60J 7/198 (2013.01)

(58) Field of Classification Search
CPC .......... B60J 7/198; B60J 7/141; B60J 7/1607; B60P 7/02; F16B 2/18
USPC ........... 296/100.01, 100.02, 100.04, 100.06, 296/100.07, 100.16; 292/256.75
See application file for complete search history.

(56) References Cited

U.S. PATENT DOCUMENTS

| | | | | |
|---|---|---|---|---|
| 9,073,417 | B1 * | 7/2015 | Smith ...................... | B60J 7/198 |
| 11,305,626 | B1 * | 4/2022 | Rossi ...................... | B60J 7/141 |
| 2019/0105974 | A1 * | 4/2019 | Parkey .................... | B60J 7/198 |
| 2021/0213814 | A1 * | 7/2021 | Shi .......................... | B60J 7/198 |

* cited by examiner

*Primary Examiner* — Stephen T Gordon
(74) *Attorney, Agent, or Firm* — Birchwood IP

(57) ABSTRACT

A locking device for a tonneau cover is provided. The locking device includes a handle, a transverse shaft rotatably mounted on the handle, a screw rod threadedly connected to the transverse shaft, and a locking portion sleeved on the screw rod. The handle is provided with a notch for swing arrangement of the screw rod, a ratchet through which the transverse shaft extends and a release button movably connected to the handle are mounted in the notch, and a toothed portion on the ratchet is engaged with at least a portion of a toothed portion of the release button. The characteristics of the ratchet are used, the ratchet and the handle are combined through a bolt, and the combination is assembled onto a base screw rod. The rotation of the handle achieves locking, and pressing the release button achieves release of the handle. Therefore, the operation is simple and convenient.

10 Claims, 4 Drawing Sheets

LOCKING DEVICE FOR TONNEAU COVER

CROSS-REFERENCE TO RELATED APPLICATIONS

This application claims priority to Chinese Patent Application No. 202522255258.2, filed on Oct. 24, 2025, which is hereby incorporated by reference in its entirety.

TECHNICAL FIELD

The present application relates to the field of automobile accessories, and in particular, to a locking device for a tonneau cover.

BACKGROUND

A pickup truck is a type of light-duty cargo vehicle in which a cargo bed with no roof is arranged behind a cab. Since a pickup truck is not provided with any covering on an upper portion of a cargo bed when leaving a factory, to prevent articles placed in the cargo bed from being affected by an external environment, a tonneau cover for covering the cargo bed is arranged on the upper portion of the cargo bed during use, and a latch is further arranged for connecting the tonneau cover and the cargo bed.

Some existing locking devices for tonneau covers require simultaneous rotation of a handle and a locking base to enable the locking base to be tightly pressed against a side edge of the cargo bed, so as to lock the tonneau cover with the cargo bed. The above operation is also required when the tonneau cover is released.

Although the above operation can achieve the connection between the tonneau cover and the cargo bed, two-hand operation is required, which causes inconvenience in releasing and locking during practical use.

SUMMARY

In view of the above defects in the prior art, an objective of the present application is to provide a locking device for a tonneau cover, which is used to solve a technical problem of inconvenience in use of a locking device for a tonneau cover.

To achieve the above objective and other related objectives, in a first aspect, the present application provides a locking device for a tonneau cover. The locking device for a tonneau cover includes: a handle, a transverse shaft rotatably mounted on the handle, a screw rod threadedly connected to the transverse shaft, and a locking portion sleeved on the screw rod, where the handle is provided with a notch for swing arrangement of the screw rod, a ratchet through which the transverse shaft extends and a release button movably connected to the handle are mounted in the notch, and a first toothed portion on the ratchet is engaged with at least a portion of a second toothed portion of the release button;

the handle has a locking state and a release state, in a case where the handle is in the locking state, at least a portion of the release button is engaged with a bottom end of the first toothed portion of the ratchet, and the handle abuts the locking portion; and in a case where the handle is in the release state, at least a portion of the release button is engaged with a top end of the first toothed portion of the ratchet, and the handle is slidably connected to the locking portion.

In an implementation of the first aspect, the release button and the handle are rotatably connected through a fixing shaft and movably accommodated in the notch, one of the handle and the release button is provided with a guiding component, the other is provided with a resetting component mounting member, one end of an elastic member is sleeved on the guiding component, and the other end of the elastic member is accommodated within the resetting component mounting member;

the release button is movable toward the handle under the action of an external force, so as to compress and deform the elastic member; the release button is reset under a restoring force of the elastic member; and at least a portion of the release button disengages from the toothed portion of the ratchet during movement of the release button toward the handle or during resetting.

In an implementation of the first aspect, a fixing shaft is disposed on the release button, at least a portion of side surfaces at two ends of the fixing shaft is provided with a beveled surface, a fixing groove for placing the fixing shaft is formed at a corresponding position of the handle, the fixing shaft is rotatably placed in the fixing groove through the beveled surface, and the fixing shaft rotates within the fixing groove in a case where the release button moves toward the handle or is reset.

In an implementation of the first aspect, a protruding limiting member is disposed on the release button, a limiting groove for placing the protruding limiting member is formed at a corresponding position of the handle, and the protruding limiting member is slidably accommodated within the limiting groove;

in a case where the release button moves toward the handle, the protruding limiting member slides toward a bottom end of the limiting groove within the limiting groove; and in a case where the release button is reset, the protruding limiting member slides toward a top end of the limiting groove within the limiting groove.

In an implementation of the first aspect, one of the handle and the locking portion is provided with detent strips, two sides of the other are provided with limiting components cooperating with the detent strips, and the limiting components are slidably connected to the detent strips.

In an implementation of the first aspect, a first limiting structure is further disposed on the notch of the handle, the first limiting structure is connected between tops of the detent strips on two sides of the handle, or the first limiting structure is connected between tops of the limiting components on two sides of the handle, and the handle is in the locking state in a case where the first limiting structure abuts the locking portion and is in a fully extended state.

In an implementation of the first aspect, the first toothed portion of the ratchet includes an upper toothed portion, a smooth portion, and a lower toothed portion, the smooth portion is located between the upper toothed portion and the lower toothed portion, and a second limiting structure is disposed at an upper end of the upper toothed portion;

in a case where at least a portion of the release button is connected to the upper toothed portion and contacts the second limiting structure, the handle is in the release state; and in a case where at least a portion of the release button is connected to the lower toothed portion and is located at a bottom end of the lower toothed portion, the handle is in the locking state.

In an implementation of the first aspect, a first through hole is formed in a radial direction of the transverse shaft, a central hole is disposed in a width direction of the ratchet, the transverse shaft simultaneously extends through a circular hole of the handle and the central hole of the ratchet, a second through hole is formed in a corresponding radial direction of the ratchet, a third through hole is formed in a radial direction of the locking portion, and a lower end of the screw rod sequentially extends through the third through hole, the second through hole and the first through hole, and is threadedly connected to the first through hole and slidably connected to the second through hole and the third through hole.

In an implementation of the first aspect, limiting platforms are disposed on two sides of the notch, the limiting platforms are located below the release button, and the movement of the release button toward the handle is completed in a case where the release button abuts the limiting platforms; and during the process in which the locking device returns to the release state, the release button does not exceed the second limiting structure disposed on the ratchet.

In an implementation of the first aspect, anti-slip patterns are disposed on the release button.

As described above, the locking device for a tonneau cover of the present application has the following beneficial effects:

According to the present application, the characteristics of the ratchet are used, the ratchet and the handle are combined together through a bolt, and the combination is assembled onto a base screw rod. The rotation of the handle achieves locking, and pressing the release button achieves release of the handle. Therefore, the operation is simple and convenient.

At least a portion of a toothed portion of the release button is engaged with the ratchet, thereby achieving unidirectional movement and locking of the handle, and limiting rebound displacement of the handle caused by vibration during vehicle travel.

The locking device for a tonneau cover of the present application has strong versatility and can adapt to all vehicle models.

Figure 1:
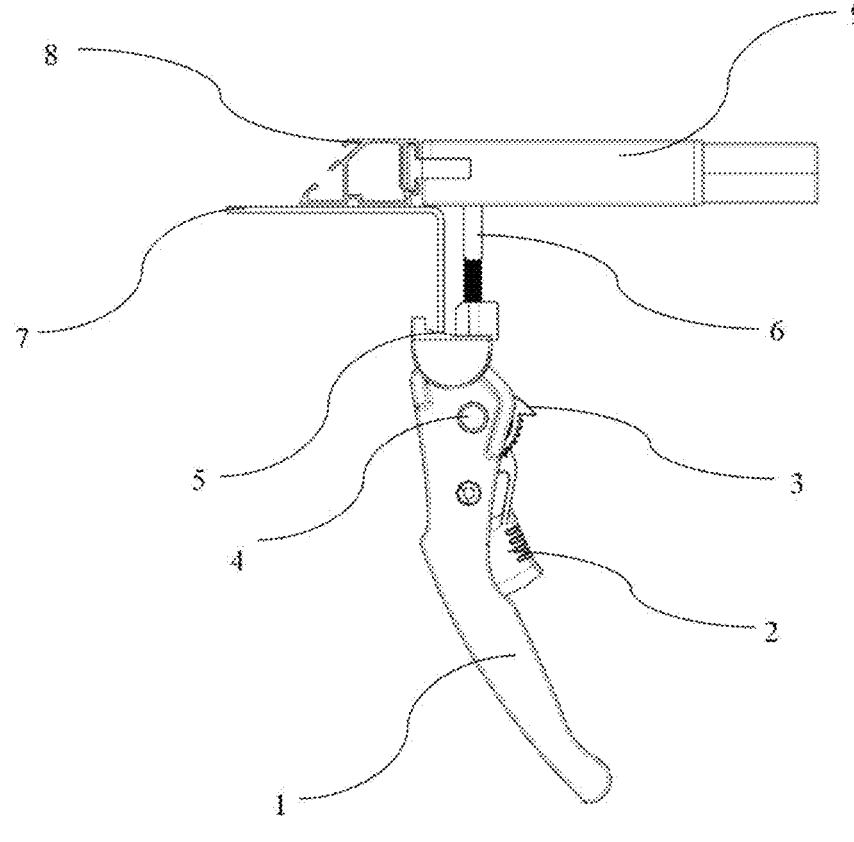
FIG. 1 is a schematic diagram of a structure of a locking device for a tonneau cover according to an embodiment of the present application.

Reference numerals: 1. handle; 11. notch; 12. first limiting structure; 13. detent strip; 14. circular hole; 15. fixing groove; 16. guiding component; 17. limiting groove; 18. limiting platform; 2. release button; 21. second toothed portion; 22. fixing shaft; 23. resetting component mounting member; 24. protruding limiting member; 25. anti-slip patterns; 3. ratchet; 31. first toothed portion; 311. upper toothed portion; 312. smooth portion; 313. lower toothed portion;

32. central hole; 33. second limiting structure; 34. second through hole; 4. transverse shaft; 41. first through hole; 5. locking portion; 51. limiting component; 52. third through hole; 6. screw rod; 7. tonneau cover frame; 8. fixing structure; 9. adapter block; and 10. elastic member.

DESCRIPTION OF EMBODIMENTS

The embodiments of the present application are described below with reference to specific examples, so that those skilled in the art can easily understand other advantages and effects of the present application from the disclosure of this specification. The present application may also be implemented or applied through other different specific embodiments, and various details in this specification may be modified or changed based on different perspectives and applications without departing from the spirit of the present application. It should be noted that the embodiments and features in the embodiments of the present application may be combined with each other without conflict.

It should be noted that the illustrations provided in the following embodiments are only schematic to illustrate the basic concept of the present application, and only components related to the present application are shown in the illustrations, rather than being drawn according to the actual number, shape, and size of components in practical implementation. In actual implementation, the types, quantities, and proportions of the components can be freely changed, and the layout and configuration of the components may also be more complex.

It should be understood that the structures, proportions, sizes, and the like shown in the drawings of this specification are only used to assist in illustrating the content disclosed in this specification, for the understanding and reading by those skilled in the art, and are not intended to limit the scope of implementation of the present application, and thus do not have substantial technical significance. Any modification of structures, changes in proportional relationships, or adjustments of sizes, as long as the modification, changes or adjustments do not affect the effects achievable by the present application or the objectives achievable thereby, shall still fall within the scope covered by the technical content disclosed in the present application. In addition, terms such as "upper", "lower", "left", "right", "front", "rear", "middle", and "one" as used in this specification are only for the convenience of clear description and are not intended to limit the scope of implementation of the present application. Changes or adjustments of relative relationships, without substantial alteration of the technical content, shall also be regarded as within the scope of the present application.

Embodiments of the present application provides a locking device for a tonneau cover. The locking device for a tonneau cover includes: a handle, a transverse shaft rotatably mounted on the handle, a screw rod threadedly connected to the transverse shaft, and a locking portion sleeved on the screw rod, where the handle is provided with a notch for swing arrangement of the screw rod, a ratchet through which the transverse shaft extends and a release button movably connected to the handle are mounted in the notch, and a first toothed portion on the ratchet is engaged with at least a portion of a second toothed portion of the release button; the handle has a locking state and a release state, in a case where the handle is in the locking state, at least a portion of the release button is engaged with a bottom end of the first toothed portion of the ratchet, and the handle abuts the locking portion; and in a case where the handle is in the release state, at least a portion of the release button is engaged with a top end of the first toothed portion of the ratchet, and the handle is slidably connected to the locking portion. According to the present application, the characteristics of the ratchet are used, the ratchet and the handle are combined together through a bolt, and the combination is assembled onto a base screw rod. The rotation of the handle achieves locking, and pressing the release button achieves release of the handle. Therefore, the operation is simple and convenient, which solves the technical problem of inconvenience in use of the locking device for a tonneau cover.

The principles and embodiments of the locking device for a tonneau cover of the present application are described in detail below with reference to FIGS. 1 to 8, so that those skilled in the art can understand the locking device for a tonneau cover of the present application without creative effort.

It should be noted that the shapes of the handle and the locking portion in the embodiments of the present application are of general shapes known in the art. For ease of description, the longitudinal direction of the handle 1 is defined as an upper-lower direction, one end of the handle 1 close to the locking portion 5 is defined as an upper side, and one end of the handle 1 far away from the locking portion 5 is defined as a lower side; the width direction of the handle 1 (i.e., a direction perpendicular to the plane of FIG. 1) is defined as a left-right direction; the thickness direction of the handle 1 (i.e., the left-right direction in FIG. 1) is defined as a front-back direction, with the right side in FIG. 1 as a front side and a left side as a rear side. The following description of each component is based on the above positioning.

Figure 2:
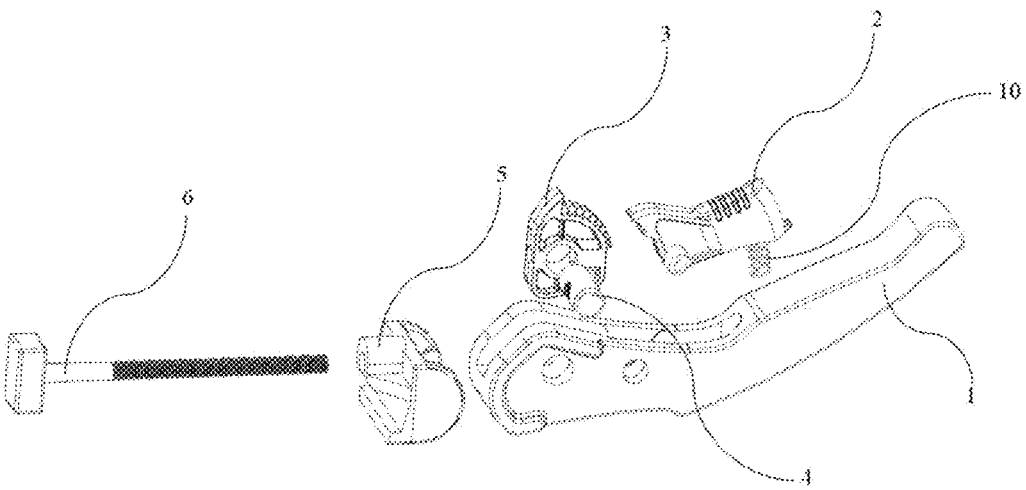
FIG. 2 is an exploded view of a locking device for a tonneau cover according to an embodiment of the present application.
Figure 3:
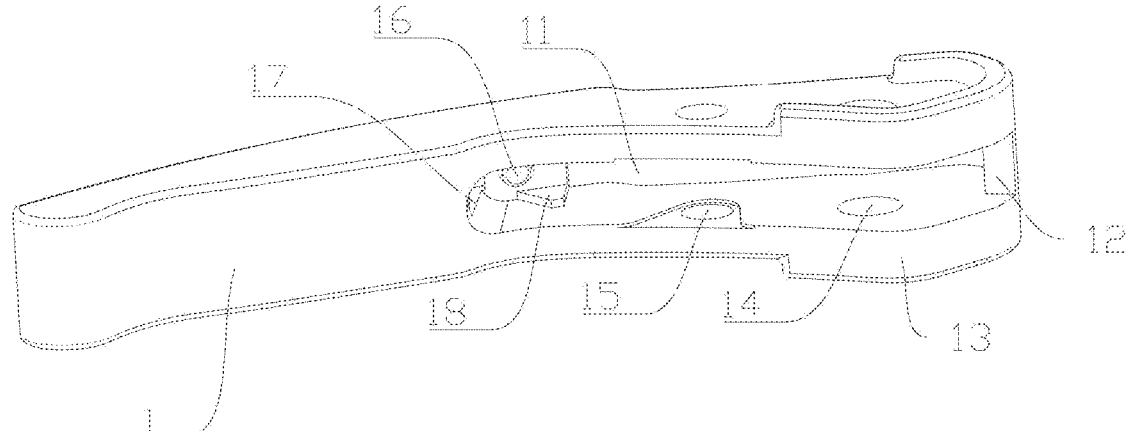
FIG. 3 is a schematic diagram of a handle according to an embodiment of the present application.

As shown in FIGS. 1 and 2, the locking device for a tonneau cover includes: a handle 1, a transverse shaft 4 rotatably mounted on the handle 1, a screw rod 6 threadedly connected to the transverse shaft 4, and a locking portion 5 sleeved on the screw rod 6, where the handle 1 is provided with a notch 11 (as shown in FIG. 3) for swing arrangement of the screw rod 6, a ratchet 3 through which the transverse shaft 4 extends and a release button 2 movably connected to the handle 1 through an elastic member 10 are mounted in the notch 11, and a first toothed portion on the ratchet 3 is engaged with at least a portion of a second toothed portion of the release button 2.

In this embodiment, the release button 2 is rotatably connected to the handle 1 through a fixing shaft 22 and is movably placed in the notch 11, and anti-slip patterns 25 are disposed on the release button 2. One of the handle 1 and the release button 2 is provided with a guiding component 16, and the other is provided with a resetting component mounting member 23; one end of the elastic member 10 is sleeved on the guiding component 16, and the other end is accommodated in the resetting component mounting member 23; the release button 2 may move toward the handle 1 under the action of an external force to compress and deform the elastic member 10, and the release button 2 may be reset under a restoring force of the elastic member 10; and at least a portion of the release button 2 disengages from the first toothed portion of the ratchet 3 in a case where the release button 2 moves toward the handle 1 or is reset.

Specifically, in this embodiment, the handle 1 has a locking state and a release state, in a case where the handle 1 is in the locking state, at least a portion of the release button 2 is engaged with a bottom end of the first toothed portion of the ratchet 3, and the handle 1 abuts the locking portion 5; and in a case where the handle 1 is in the release state, at least a portion of the release button 2 is engaged with a top end of the first toothed portion of the ratchet 3, and the handle 1 is slidably connected to the locking portion 5.

For ease of description, the longitudinal direction of the notch 11 is defined as an upper-lower direction, one end of the notch 11 close to the locking portion 5 is defined as an upper side, and one end of the notch 11 far away from the locking portion 5 is defined as a lower side; the thickness direction of the notch 11 (i.e., the upper-lower direction in FIG. 3) is defined as a left-right direction, with an upper end in FIG. 3 as a left side and a lower end as a right side; and the width direction of the notch 11 (i.e., a direction perpendicular to the plane of FIG. 3) is defined as a front-back direction. The following description of each component is based on the above positioning.

As shown in FIG. 3, a notch 11 is disposed between the upper-lower direction of the handle 1, and the notch 11 extends through the front-rear direction of the handle 1. Circular holes 14 are formed on side walls of the notch 11 in the left-right direction, fixing grooves 15 are formed on opposite surfaces of the side walls of the notch 11 in the left-right direction, a limiting groove 17 is provided below the notch 11, and a portion where a rear side and a lower side of the notch 11 are connected is formed with a protruding platform on which the guiding component 16 is provided. Limiting platforms 18 are further formed on the opposite surfaces of the side walls of the notch 11 in the left-right direction, and the upper portion of the side walls of the notch 11 in the left-right direction is provided with detent strips 13 and a first limiting structure 12 disposed between the detent strips 13 and connected to the detent strips 13.

Figure 4:
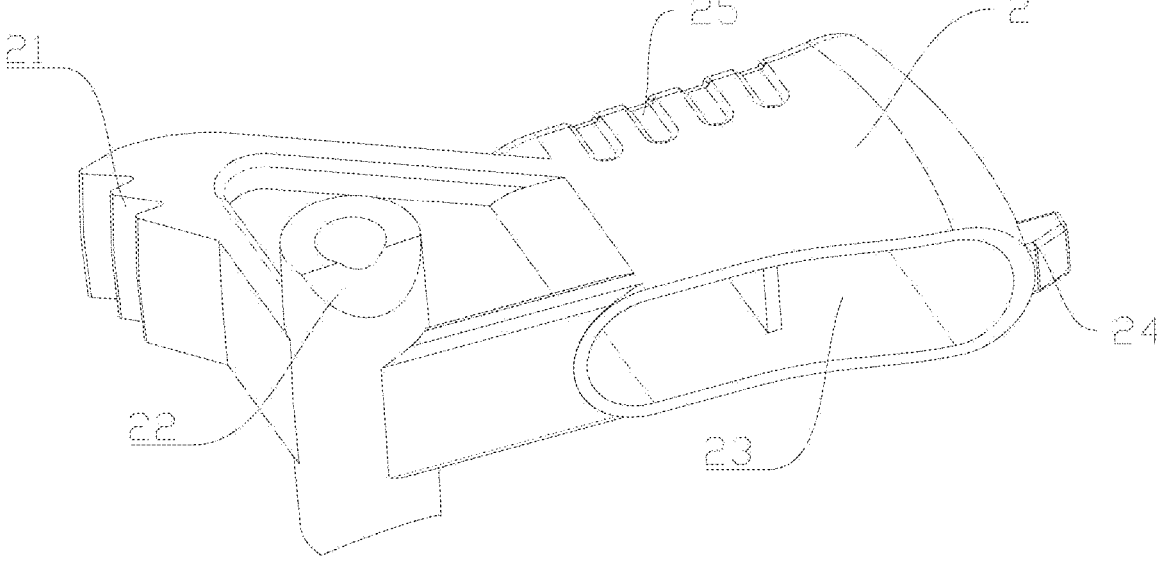
FIG. 4 is a schematic diagram of a release button according to an embodiment of the present application.

As shown in FIG. 4, the release button 2 includes a second toothed portion 21, fixing shafts 22 are disposed at front ends of two side surfaces of the release button 2, and at least a portion of side surfaces at two ends of the fixing shaft 22 is provided with beveled surfaces; a resetting component mounting member 23 is disposed at a bottom of the release button 2, a protruding limiting member 24 is disposed at one end of the release button 2 far away from the second toothed portion, and anti-slip patterns 25 are provided to facilitate pressing.

As shown in FIGS. 3 and 4, one end of the elastic member 10 is sleeved on the guiding component 16, and the other end of the elastic member 10 is accommodated in the resetting component mounting member 23. Specifically, the release button 2 is movable toward the handle 1 under the action of an external force, so that the elastic member 10 is compressed and deformed, and the release button 2 is reset under a restoring force of the elastic member 10.

As shown in FIGS. 3 and 4, a fixing groove 15 for placing the fixing shaft 22 is formed at a corresponding position of the handle 1, the fixing shaft 22 is rotatably placed in the fixing groove 15 through the beveled surface, and the fixing shaft 22 rotates within the fixing groove 15 in a case where the release button 2 moves toward the handle 1 or is reset.

As shown in FIGS. 3 and 4, a protruding limiting member 24 is disposed on the release button 2, a limiting groove 17 for placing the protruding limiting member 24 is formed at a corresponding position of the handle 1, and the protruding limiting member 24 is slidably accommodated within the limiting groove 17; in a case where the release button 2 moves toward the handle 1, the protruding limiting member 24 slides toward a bottom end of the limiting groove 17 within the limiting groove 17; and in a case where the release button 2 is reset, the protruding limiting member 24 slides toward a top end of the limiting groove 17 within the limiting groove 17.

As shown in FIGS. 3 and 4, limiting platforms 18 are disposed on two sides of the notch 11, the limiting platforms 18 are located below the release button 2, and the movement of the release button 2 toward the handle 1 is completed in a case where the release button 2 abuts the limiting platforms 18; and during the process in which the locking device returns to the release state, the release button 2 does not exceed the second limiting structure 33 disposed on the ratchet 3. The limiting platform 18 is located below the release button 2. In a case where the release button 2 abuts the limiting platform 18, pressing of the release button 2 reaches a maximum, that is, the movement of the release button 2 toward the handle 1 is completed.

Figure 5:
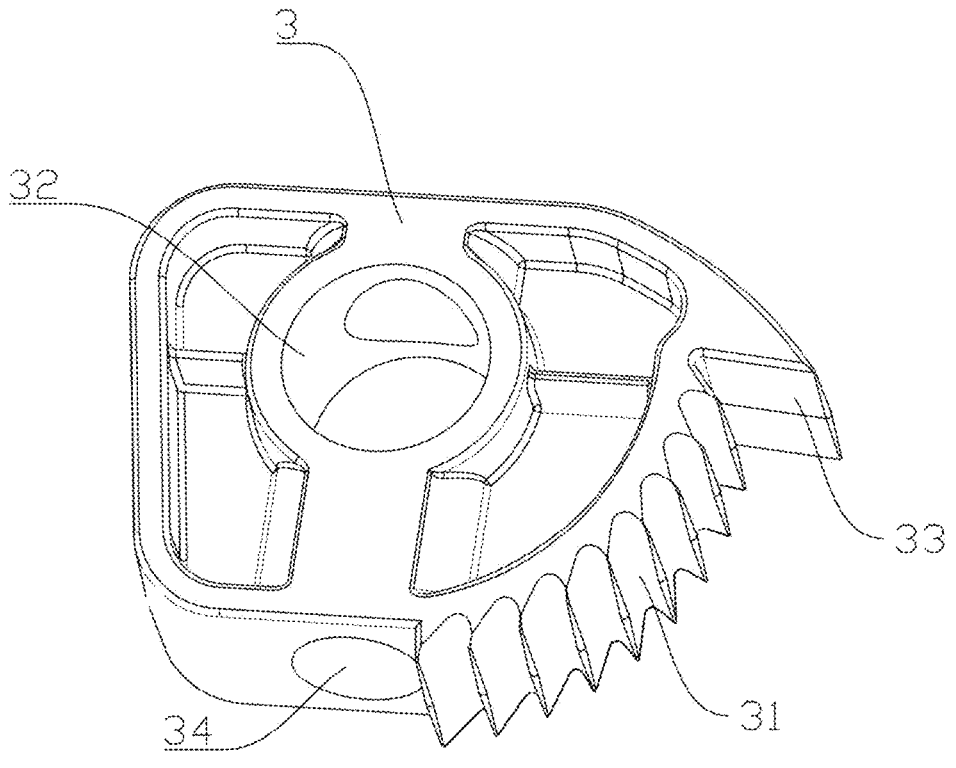
FIG. 5 is a schematic diagram of a ratchet according to an embodiment of the present application.

As shown in FIG. 5, a first limiting structure 12 is further disposed on the notch 11 of the handle 1, the first limiting structure 12 is connected between tops of the detent strips 13 on two sides of the handle 1, or the first limiting structure 12 is connected between tops of the limiting components 51 on two sides of the handle 1, and the handle 1 is in the locking state in a case where the first limiting structure 12 abuts the locking portion 5 and is in a fully extended state.

As shown in FIG. 5, the ratchet 3 includes a first toothed portion 31, a central hole 32 extending through the ratchet 3, a second through hole 34 perpendicular to the central hole 32, and a second limiting structure 33 located above the first toothed portion 31. Specifically, the upper end of the toothed portion of the ratchet 3 is provided with the second limiting structure 33. In a case where at least a portion of the release button 2 is engaged with the upper toothed portion and contacts the second limiting structure 33, the handle 1 is in the release state. In a case where at least a portion of the release button 2 is engaged with the lower toothed portion and located at the bottom end of the lower toothed portion, the handle 1 is in the locking state.

Figure 8:
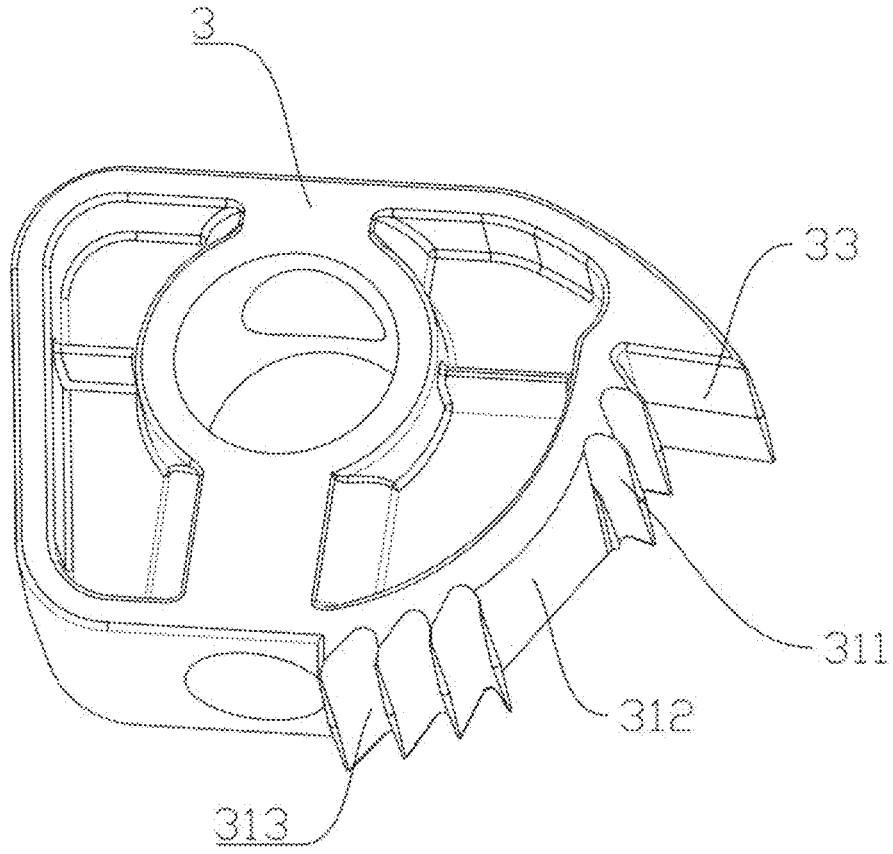
FIG. 8 is another schematic diagram of a structure of a ratchet.

As shown in FIG. 8, in another embodiment, the first toothed portion of the ratchet 3 further includes: an upper toothed portion 311, a smooth portion 312, and a lower toothed portion 313, the smooth portion 312 is located between the upper toothed portion 311 and the lower toothed portion 313, and a second limiting structure 33 is disposed at an upper end of the upper toothed portion 311.

Figure 7:
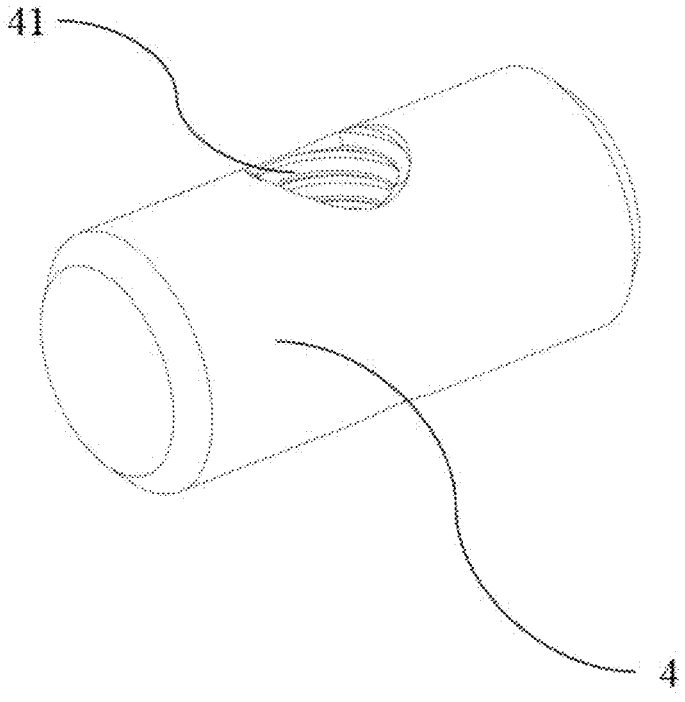
FIG. 7 is a schematic diagram of a transverse shaft according to an embodiment of the present application.

As shown in FIGS. 3, 5 and 7, the transverse shaft 4 slidably extends through the circular hole 14 and the central hole 32 to dispose the ratchet within the notch 11. A first through hole 41 is formed in a radial direction of the transverse shaft 4, the central hole 32 is disposed in a width direction of the ratchet 3, the transverse shaft 4 simultaneously extends through the circular hole 14 of the handle and the central hole 32 of the ratchet, a second through hole 34 is formed in a corresponding radial direction of the ratchet 3, and a third through hole 52 is formed in a radial direction of the locking portion 5.

Figure 6:
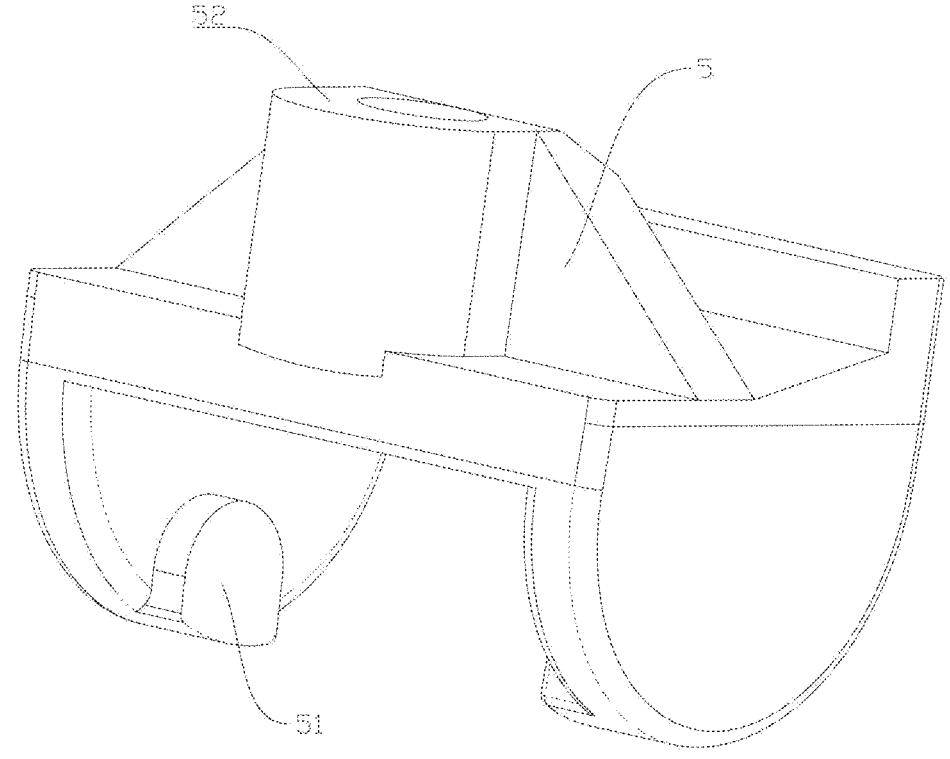
FIG. 6 is a schematic diagram of a locking portion according to an embodiment of the present application.

As shown in FIGS. 6 and 7, one of the handle 1 and the locking portion 5 are provided with detent strips 13, two sides of the other are provided with limiting components 51 cooperating with the detent strips, and the limiting components 51 are slidably connected to the detent strips 13. The limiting components 51 cooperating with the detent strips 13 are provided on two sides of the locking portion 5. Two limiting components 51 are located below the locking portion 5, and a space is formed between the two limiting components 51. A third through hole 52 is formed in a radial direction of the locking portion 5, and a first through hole 41 is formed in a radial direction of the transverse shaft 4.

As shown in FIGS. 3 and 5 to 7, a lower end of the screw rod 6 sequentially extends through the third through hole 52, the second through hole 34 and the first through hole 41, and is threadedly connected to the first through hole 41 and slidably connected to the second through hole 34 and the third through hole 52.

As shown in FIG. 1, when being mounted on the cargo bed, the locking device for a tonneau cover further includes a tonneau cover frame 7, a fixing structure 8, and an adapter block 9, where an upper end of the screw rod 6 includes a fixing block, the fixing block is slidably disposed in the adapter block 9, the adapter block 9 is connected to the tonneau cover frame 7 through a nut and the fixing structure 8, so that the locking device is slidably connected to a tonneau cover.

The working principle of the locking device for a tonneau cover according to the embodiment of the present application is as follows:

In a case where the locking device for a tonneau cover is in a release state, the release button 2 is located at a top end of the stroke, the handle 1 is inclined and connected to the screw rod 6, and the handle 1 is movable relative to the locking portion 5.

In a process of transitioning the locking device for a tonneau cover from the release state to a locking state, the handle 1 is rotated in a direction away from the locking portion 5. During rotation of the handle 1, the second toothed portion 21 on the release button 2 rotates along a rotational direction of the first toothed portion 31 on the ratchet 3. In a case where the first limiting structure 12 of the handle 1 abuts the screw rod 6, the handle 1 reaches a maximum rotation stroke. In this case, an upper surface of the first limiting structure 12 on the handle 1 abuts a lower surface of the locking portion 5 in a fully extended state. In this case, due to meshing between the first toothed portion 31 and the second toothed portion 21, the handle 1 cannot rotate in a reverse direction, thereby achieving locking of the locking device for a tonneau cover.

In a process of transitioning the locking device for a tonneau cover from the locking state to the release state, the release button 2 is pressed under the action of a spring. In a case where a lower end of the release button 2 abuts the limiting platform 18, the release button 2 reaches a maximum pressing stroke. In this case, the second toothed portion 21 of the release button 2 disengages from the first toothed portion 31 of the ratchet 3. After disengagement, the handle 1 is rotated in a direction toward the locking portion 5. The first limiting structure 12 moves away from the screw rod 6 along with rotation of the handle 1, and an upper surface of the first limiting structure 12 moves away from a lower surface of the locking portion 5. In a case where a top end of the second toothed portion 21 gradually approaches and abuts a second limiting structure 33 above the first toothed portion 31, the handle 1 reaches a maximum rotation stroke. After releasing the pressed release button 2, the second toothed portion 21 meshes with the first toothed portion 31, the release button 2 is located at a top end of the stroke, the handle 1 is inclined and connected to the screw rod 6, and the handle 1 is movable relative to the locking portion 5, so that the locking device for a tonneau cover is returned to the release state.

In summary, according to the locking device for a tonneau cover of the present application, the characteristics of the ratchet are used, the ratchet and the handle are combined together through a bolt, and the combination is assembled onto a base screw rod. The rotation of the handle achieves locking, and pressing the release button achieves release of the handle. Therefore, the operation is simple and convenient. At least a portion of a toothed portion of the release button is engaged with the ratchet, thereby achieving unidirectional movement and locking of the handle, and limiting rebound displacement of the handle caused by vibration during vehicle travel. In addition, the locking device for a tonneau cover of the present application has strong versatility and can adapt to all vehicle models. Therefore, the present application effectively overcomes various defects in the prior art and has high industrial applicability.

The above embodiments are illustrative to describe the principles and effects of the present application, and are not intended to limit the present application. Those skilled in the art can make modifications or alterations to the above embodiments without departing from the spirit and scope of the present application. Accordingly, all equivalent modifications or alterations completed by those of ordinary skill in the art in the technical field without departing from the spirit and technical concept disclosed in the present application shall still fall within the scope of the claims of the present application.

What is claimed is:

1. A locking device for a tonneau cover, comprising: a handle, a transverse shaft rotatably mounted on the handle, a screw rod threadedly connected to the transverse shaft, and a locking portion sleeved on the screw rod, wherein the handle is provided with a notch for swing arrangement of the screw rod, a ratchet through which the transverse shaft extends and a release button movably connected to the handle are mounted in the notch, and a first toothed portion on the ratchet is engaged with at least a portion of a second toothed portion of the release button;

the handle has a locking state and a release state, in a case where the handle is in the locking state, at least a portion of the release button is engaged with a bottom end of the first toothed portion of the ratchet, and the handle abuts the locking portion; and in a case where the handle is in the release state, at least a portion of the release button is engaged with a top end of the first toothed portion of the ratchet, and the handle is slidably connected to the locking portion.

2. The locking device for a tonneau cover according to claim 1, wherein the release button and the handle are rotatably connected through a fixing shaft and movably accommodated in the notch, one of the handle and the release button is provided with a guiding component, the other is provided with a resetting component mounting member, one end of an elastic member is sleeved on the guiding component, and the other end of the elastic member is accommodated within the resetting component mounting member;

the release button is movable toward the handle under the action of an external force, so as to compress and deform the elastic member; the release button is reset under a restoring force of the elastic member; and at least a portion of the release button disengages from the toothed portion of the ratchet during movement of the release button toward the handle or during resetting.

3. The locking device for a tonneau cover according to claim 2, wherein the fixing shaft is disposed on the release button, at least a portion of side surfaces at two ends of the fixing shaft is provided with a beveled surface, a fixing groove for placing the fixing shaft is formed at a corresponding position of the handle, and the fixing shaft is rotatably placed in the fixing groove through the beveled surface; and the fixing shaft rotates within the fixing groove in a case where the release button moves toward the handle or is reset.

4. The locking device for a tonneau cover according to claim 2, wherein a protruding limiting member is disposed on the release button, a limiting groove for placing the protruding limiting member is formed at a corresponding position of the handle, and the protruding limiting member is slidably accommodated within the limiting groove;

in a case where the release button moves toward the handle, the protruding limiting member slides toward a bottom end of the limiting groove within the limiting groove; and in a case where the release button is reset, the protruding limiting member slides toward a top end of the limiting groove within the limiting groove.

5. The locking device for a tonneau cover according to claim 1, wherein one of the handle and the locking portion is provided with detent strips, two sides of the other are provided with limiting components cooperating with the detent strips, and the limiting components are slidably connected to the detent strips.

6. The locking device for a tonneau cover according to claim 5, wherein a first limiting structure is further disposed on the notch of the handle, the first limiting structure is connected between tops of the detent strips on two sides of the handle, or the first limiting structure is connected between tops of the limiting components on two sides of the handle, and the handle is in the locking state in a case where the first limiting structure abuts the locking portion and is in a fully extended state.

7. The locking device for a tonneau cover according to claim 2, wherein the first toothed portion of the ratchet comprises an upper toothed portion, a smooth portion, and a lower toothed portion, the smooth portion is located between the upper toothed portion and the lower toothed portion, and a second limiting structure is disposed at an upper end of the upper toothed portion;

in a case where at least a portion of the release button is connected to the upper toothed portion and contacts the second limiting structure, the handle is in the release state; and in a case where at least a portion of the release button is connected to the lower toothed portion and is located at a bottom end of the lower toothed portion, the handle is in the locking state.

8. The locking device for a tonneau cover according to claim 1, wherein a first through hole is formed in a radial direction of the transverse shaft, a central hole is disposed in a width direction of the ratchet, the transverse shaft simultaneously extends through a circular hole of the handle and the central hole of the ratchet, a second through hole is formed in a corresponding radial direction of the ratchet, a third through hole is formed in a radial direction of the locking portion, and a lower end of the screw rod sequentially extends through the third through hole, the second through hole and the first through hole, and is threadedly connected to the first through hole and slidably connected to the second through hole and the third through hole.

9. The locking device for a tonneau cover according to claim 1, wherein limiting platforms are disposed on two sides of the notch, the limiting platforms are located below the release button, and the movement of the release button toward the handle is completed in a case where the release button abuts the limiting platforms; and during the process in which the locking device returns to the release state, the release button does not exceed a second limiting structure disposed on the ratchet.

10. The locking device for a tonneau cover according to claim 1, wherein anti-slip patterns are disposed on the release button.

* * * * *